United States Patent [19]
Eisenmann et al.

[11] Patent Number: 4,733,977
[45] Date of Patent: Mar. 29, 1988

[54] SEAL FOR ROLLERS

[75] Inventors: Leo Eisenmann, Elfershausen; Georg Rudloff, Grafenrheinfeld, both of Fed. Rep. of Germany

[73] Assignee: FAG Kugelfischer Georg Schafer (KGaA), Fed. Rep. of Germany

[21] Appl. No.: 824,162

[22] Filed: Jan. 30, 1986

[30] Foreign Application Priority Data

Feb. 1, 1985 [DE] Fed. Rep. of Germany ....... 3503344

[51] Int. Cl.$^4$ ............................................. F16C 33/78
[52] U.S. Cl. ..................................... 384/477; 384/557
[58] Field of Search ............... 384/478, 488, 587, 480, 384/144, 477, 557, 905

[56] References Cited
U.S. PATENT DOCUMENTS 1,856,547  5/1932  Gotthardt ........................... 384/488
4,527,915  7/1985  Ikariishi et al. ..................... 384/480
4,557,490  12/1985  Tavares .............................. 384/480

Primary Examiner—Lenard A. Footland
Attorney, Agent, or Firm—Ostrolenk, Faber, Gerb & Soffen

[57] ABSTRACT

A seal arrangement for rollers which permits axial displacement of a roller and its shaft with respect to their supporting bearing. A sealing ring which is generally L-shaped in cross-section has one radial arm of the L mounted on the shaft and against the roller, to provide a seal with respect to the roller. The other arm of the L extends axially away from the roller and has an outer circumferential surface which lies closely adjacent an inner surface of the bearing housing to provide a seal with respect to the housing. Lamellar rings may be provided between the bearing housing and the sealing ring.

9 Claims, 1 Drawing Figure

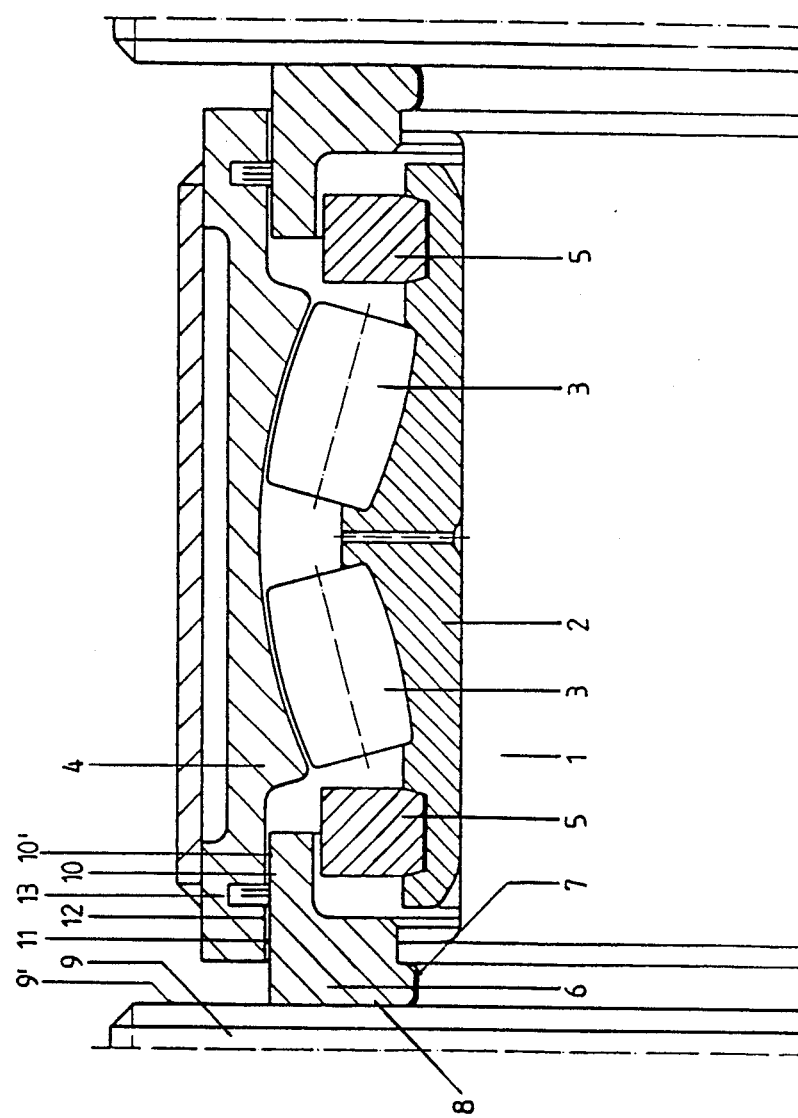

SEAL FOR ROLLERS

BACKGROUND OF THE INVENTION

1. Field of the Invention

The invention relates to a seal arrangement for rollers, and more particularly to a seal arrangement which forms an effective seal while permitting some axial displacement of the rollers with respect to their supporting bearings. The invention is particularly contemplated for use in continuous casting plants and similar installations.

2. Description of the Related Art

Seals for driven rollers are known, and are described, for instance, in FAG Publication 17 504 of 1983. In order to prevent the penetration of dirt, etc., into the bearing, an axially oriented sealing ring is provided on the bearing housing, a free end of said ring extending into a circular groove on the end surface of the roller. Such an arrangement has the disadvantage that the roller is weakened in its end region. Cracks in the roller frequently commence there. Furthermore, the production of the grooves is difficult and expensive. Sealing problems can also arise, since the lubricant which passes into the gap between the groove and the end of the ring can become baked fast by the heat.

SUMMARY OF THE INVENTION

A principal object of the present invention is therefore to provide an improved seal arrangement which permits axial displacement of driven rollers in which said disadvantages do not occur and, in particular, in which it is not necessary to provide circular grooves in the rollers.

According to an aspect of the invention, there is provided a sealed roller arrangement comprising a roller; a shaft with which the roller rotates; a bearing for supporting the shaft, the bearing having a housing; and a sealing ring having (i) a first portion mounted closely adjacent the roller so as to prevent entry of unwanted material between the sealing ring and the roller and (ii) a second portion which extends from the first portion, to a location closely adjacent the bearing housing, so as to prevent entry of unwanted material between the sealing ring and the bearing housing.

More specifically, instead of the sealing ring being secured to the housing as in prior systems, the sealing ring of the invention is associated with the roller and its shaft, and extends into a space between the shaft and the housing. The housing also advantageously incorporates the outer race for the roller bearings of the shaft bearing. Mounting of the sealing ring is simplified by dividing the sealing ring into segments, which are fitted about the shaft and then connected together. The sealing ring is generally L-shaped in cross-section. One radial arm of the ring rests against the end surface of the roller and prevents the penetration of dirt there. The other arm of the L-shaped seal ring extends axially away from the roller with the cylindrical outer surface of the arm facing, across a slight clearance, the inner surface of a bore portion of the housing. In this way, there is obtained a long, narrow, labyrinthine gap which prevents the penetration of dirt and other matter into the bearing, but nevertheless permits displacement of the parts axially, i.e., parallel to the gap, Surprisingly, an effective seal may be obtained even if the gap is relatively large, which is important in view of the large temperature differences that can exist between the various parts.

In accordance with another aspect of the invention, an additional seal may be provided, preferably in the form of lamellar rings projecting from the bore portion of the housing, in the region of the facing sealing ring and bore surfaces. In this way, the sealing effect may be substantially increased.

According to a further aspect, within the region of the facing surfaces a shoulder can be provided on the sealing ring and another shoulder provided on the housing, with sufficient axial spacing between the two shoulders to provide for axial displacement of the roller. This measure is also simple and effective.

BRIEF DESCRIPTION OF THE DRAWING

The invention will be described with reference to a single FIGURE, which shows a view, partially in cross-section, of two driven rollers and a bearing therebetween employing a seal according to an embodiment of the invention.

DETAILED DESCRIPTION OF A PREFERRED EMBODIMENT

Referring to the FIGURE, there are seen two rollers 9 which are interconnected by a shaft 1. The arrangement may be of the sort employed in continuous casting plants. The inner race 2 of a self-aligning roller bearing is seated on the shaft 1. The inner race 2 may be axially displaceable along the shaft 1. Two roller bearings 3 are shown seated on the inner race 2. A housing 4, in this embodiment, incorporates an outer race for the roller bearings. Accordingly, any radially outward movements of the shaft 1 cause the inner race 2 and roller bearings 3 to bear against the housing 4 to oppose such movements of the shaft. The inner race 2 is provided in segments and fastened on the shaft 1 by clamping rings 5 which are also formed in segments and then connected together, for example by nuts and bolts or other fasteners.

Also seen in the FIGURE is a sealing ring 6 which is generally L-shaped in cross-section. The sealing ring 6 is advantageously formed in segments. One radially extending arm 8 of the L-shaped ring is mounted in this embodiment by being fitted into a circumferential groove 7 formed intermediate the roller 9 and the shaft 1. The radially extending surface of the latter arm 8 is disposed against the end surface 9' of the roller 9. The sealing ring 6 may be fixed in the groove 7 so as to rotate with the roller 9 and the shaft 1. The axially extending other arm 10 of the sealing ring 6 has an outer cylindrical surface 10'. The surface 10' faces, across a slight clearance, a generally cylindrical inner bore 12 of the housing 4, and thus defines a relatively narrow sealing gap. This gap permits axial displacement of the sealing ring 6 with respect to the housing 4, but nevertheless provides an effective seal between the exterior and the interior of the housing.

An additional seal 13, for example lamellar rings, may be provided between the surface 10' and the bore 12.

A free end portion of the arm 10 away from the roller advantageously forms a generally radial shoulder, which is juxtaposed with a corresponding generally radial shoulder formed in the housing 4. Sufficient axial spacing is provided between the two shoulders to provide the desired axial displacement of the roller and sealing ring.

What is claimed is:

1. A sealed bearing arrangement for use with a roller such as a driven roller in a continuous casting plant or the like wherein a shaft rotates with the roller and lengthens a predetermined amount in use under the influence of heat, said bearing arrangement comprising:
   a bearing for supporting the shaft, said bearing having a housing, said roller and shaft being axially movable with respect to said housing, and
   a sealing ring adjacent to the roller which rotates with the roller, the sealing ring having an L-shaped cross-section, said L-shape being formed by
   (i) a first portion which is mounted closely adjacent the roller so as to prevent entry of unwanted material between the sealing ring and the roller, and extends radially outward, away from the axis of the shaft, and
   (ii) means defining a second portion which extends axially and parallel to the axis of the shaft, from a radially outward part of the first portion to a location closely adjacent the bearing housing, so as to prevent entry of unwanted material between the sealing ring and the bearing housing, while permitting axial movement of said sealing ring with respect to said housing, as said shaft lengthens said predetermined amount and thereby moves axially with respect to said housing under the influence of heat.

2. An arrangement as in claim 1, wherein the first portion of the sealing ring has a sealing surface which is disposed closely adjacent the roller.

3. An arrangement as in claim 1, wherein the bearing housing and the second portion of the sealing ring have respective sealing surfaces which are disposed closely adjacent one another.

4. An arrangement as in claim 3, wherein the sealing surface of the bearing housing is radially outward of the sealing surface of the sealing ring and said surfaces are generally coaxial and both extend generally parallel to the axis of the shaft, so as to permit relative axial displacement of said two surfaces while preventing entry of such unwanted material.

5. An arrangement as in claim 4, wherein the bearing for supporting the shaft includes at least one roller bearing, and the bearing housing has an outer race to restrain such roller bearing against radially outward movement; and further comprising:
   an inner bearing race for said at least one roller bearing, which is secured to said shaft for rotation therewith, while permitting axial movement between the inner race and the shaft as said shaft lengthens under the influence of heat;
   said second portion of said sealing ring having an inner sealing surface surrounding a portion of said inner race; said inner race having a sealing surface which is closely radially inward of and generally coaxial with said inner sealing surface of said sealing ring, to permit relative axial displacement of said sealing ring with respect to said inner race while preventing entry of unwanted material between said sealing ring and said inner race.

6. An arrangement as in claim 5, wherein the bearing housing and the outer bearing race are formed integrally.

7. An arrangement as in claim 1, wherein
   the sealing ring is axially displaceable with respect to the bearing housing,
   the second portion of the sealing ring has a free end portion spaced away from the roller, and
   the bearing housing has therein a generally radial shoulder, said free end portion and said shoulder being spaced a selected distance from one another to permit such axial displacement by up to such selected distance.

8. A sealed roller arrangement comprising:
   (a) a roller,
   (b) a shaft with which the roller rotates,
   (c) a bearing for supporting the shaft, said bearing having a housing, and
   (d) a sealing ring having
   (i) a first portion which is mounted closely adjacent the roller so as to prevent entry of unwanted material between the sealing ring and the roller, and
   (ii) a second portion which extends from the first portion, to a location closely adjacent the bearing housing, so as to prevent entry of unwanted material between the sealing ring and the bearing housing;
   the bearing housing and the second portion of the sealing ring having respective sealing surfaces which are disposed closely adjacent one another;
   the sealing surface of the bearing housing being radially outward of the sealing surface of the sealing ring and said surfaces are generally coaxial, so as to permit relative axial displacement of said two surfaces while preventing entry of such unwanted material, and
   further comprising lamellar rings extending radially between the sealing surfaces of the bearing housing and the sealing ring for further preventing entry of unwanted material.

9. An arrangement as in claim 8, wherein the lamellar rings are mounted on the bearing housing.

* * * * *